US008817577B2

(12) United States Patent
Azimi-Sadjadi et al.

(10) Patent No.: US 8,817,577 B2
(45) Date of Patent: Aug. 26, 2014

(54) GUNSHOT LOCATING SYSTEM AND METHOD

(76) Inventors: Mahmood R. Azimi-Sadjadi, Fort Collins, CO (US); SaravanaKumar Srinivasan, Fort Collins, CO (US)

(*) Notice: Subject to any disclaimer, the term of this patent is extended or adjusted under 35 U.S.C. 154(b) by 692 days.

(21) Appl. No.: 13/116,111

(22) Filed: May 26, 2011

(65) Prior Publication Data

US 2012/0300587 A1    Nov. 29, 2012

(51) Int. Cl.
  *G01S 3/80* (2006.01)
  *G01S 11/14* (2006.01)
  *G01S 3/808* (2006.01)

(52) U.S. Cl.
  CPC ............ *G01S 11/14* (2013.01); *G01S 3/8083* (2013.01)
  USPC .......................................... 367/124; 367/118

(58) Field of Classification Search
  USPC .................................. 367/118–127
  See application file for complete search history.

(56) References Cited

U.S. PATENT DOCUMENTS

| | | | |
|---|---|---|---|
| 5,241,518 A | 8/1993 | McNelis et al. | |
| 6,178,141 B1 | 1/2001 | Duckworth et al. | |
| 6,847,587 B2 | 1/2005 | Patterson et al. | |
| 7,126,877 B2 | 10/2006 | Barger et al. | |
| 7,292,501 B2 | 11/2007 | Barger | |
| 7,359,285 B2 | 4/2008 | Barger et al. | |
| 7,433,266 B2 | 10/2008 | Ledeczi et al. | |
| 2010/0226210 A1* | 9/2010 | Kordis et al. | 367/127 |
| 2010/0271905 A1* | 10/2010 | Khan et al. | 367/124 |

OTHER PUBLICATIONS

P. Volgyesi, G. Balogh, A. Nadas, C.B. Nash, and A. Ledeczi, "Shooter localization and weapon classification with soldier-wearable networked sensors," in MobiSys '07: Proceedings of the 5th international conference on Mobile systems, applications and services. New York, NY, USA: ACM, 2007, pp. 113-126.
E. Danicki, "The shock wave-based acoustic sniper localization," Archives of Acoustics, vol. 30, No. 2, pp. 233-245, 2005.
B. Chen and P. Willett, "Detection of hidden Markov model transient signals, " IEEE Transactions on Aerospace and Electronic Systems, vol. 36, No. 4, pp. 1253-1268, Oct. 2000.
Y. Jiang and M.R. Azimi-Sadjadi, "A robust source localization algorithm applied to acoustic sensor networks," in Proc. of 2007 IEEE Inter. Conf. on Acoustics, Speech and Signal Processing (ICASSP'07), vol. 3, 2007, pp. 1233-1236.
B.M. Sadler, T. Pham, and L.C. Sadler, "Optimal and wavelet-based shock wave detection and estimation," Journal of Acoustical Society of America, vol. 104, pp. 955-963, Aug. 1998.
G. Whitham, "Flow pattern of a supersonic projectile," Communications on Pure and Applied Mathematics, vol. 5, pp. 301-348, 1952.
S. Haykin, "Neural networks and learning machines, 3rd edition," Prentice-Hall, 2009.

* cited by examiner

*Primary Examiner* — Isam Alsomiri
*Assistant Examiner* — Hovhannes Baghdasaryan
(74) *Attorney, Agent, or Firm* — Ancel W. Lewis, Jr.

(57) ABSTRACT

A system for determining the origin and trajectory of a gunshot includes spaced sensor nodes and a base station. A method for determining the origin and trajectory of a gunshot includes the steps of, at the nodes, sensing acoustic signals, converting the acoustic signals into digital signals, separating the digital signals into segments, calculating a time of arrival of each segment, and extracting features from each segment, and then at the base station identifying each time of arrival as a main shock wave or a main muzzle blast time of arrival from the features, and computing the trajectory from the main shock wave times of arrival. The computed trajectory includes velocity and acceleration. The method also includes computing, at the base station, the origin from the main muzzle blast times of arrival.

20 Claims, 4 Drawing Sheets

GUNSHOT LOCATING SYSTEM AND METHOD

TECHNICAL FIELD

The present invention relates to systems and methods for locating the origin of weapon fire and more particularly to a system and method for determining the origin and trajectory of a gunshot projectile with a distributed wireless acoustic sensor network.

BACKGROUND ART

Shooting incidents in the U.S. and in the rest of the world are on the rise. The number one problem most police personnel and U.S. forces operating in hostile urban areas face is not being able to detect where the shooter is actually located at any given time during the pursuit. It is difficult for humans to rely strictly on their hearing to locate where the sound of gunfire is coming from. Police and military personnel also have trouble relying on witness accounts during these events because people often give inaccurate information when they are in a state of panic, shock and confusion. Additionally, decisions must be made very quickly and accurately before additional causalities are inflicted. A solution that would greatly benefit military, police and law enforcement agencies should offer not only real-time detection of transient sounds such as gunshots or explosives, but also the ability to determine the location of sources of the transient sounds.

Guns, including firearms and artillery, generally generate a muzzle blast when the gun is fired. The muzzle blast propagates spherically outwardly from the muzzle of the gun. Some prior known systems use only the muzzle blast to attempt to locate the origin of the gunshot. Such systems can use acoustic sensors and triangulation methods to find the origin of the gunshot. Other systems that use only the muzzle blast for locating the origin of the gunshot, record the Time of Arrival (ToA) of the wavefront of the muzzle blast at a plurality of sensors in known locations. These systems can perform trilateration or multilateration using the ToA or the Time Difference of Arrival (TDoA) of the acoustic wavefront of the muzzle blast at the sensors to locate the origin of the gunshot.

There are several known problems with systems and methods that use only the muzzle blast to find the location of a gunshot. The muzzle blast can be suppressed. Buildings and local topography can corrupt the acoustic signal of the muzzle blast. Multipath signals or echoes can obscure the original muzzle blast acoustic signal.

Projectiles fired from some guns exceed the speed of sound. These supersonic projectiles generate a ballistic shock wave. This shock wave is an acoustic pressure wave signal that propagates from the projectile, normal to the shock wave cone 33, as the projectile travels.

Prior known systems that use only the shock wave to compute the trajectory of the projectile generally require a directional array of sensors. The ability to find the origin of the gunshot using only the shock wave is limited. U.S. Pat. No. 5,241,518 to McNelis, et al. discloses a system and method with three precisely located sensors each having three closely spaced, precisely positioned transducers. The method in McNelis, et al. uses the ToA of the shock wave at each transducer in a sensor to compute an angle of arrival, and computes a trajectory from the three angles of arrival. The method in McNelis, et al. assumes the shock wave is a plane wave and a constant velocity projectile.

U.S. Pat. No. 7,292,501 to Barger discloses a system and method that uses force sensors to compute the angle of arrival of the shock wave, and therefrom, the trajectory of the projectile. U.S. Pat. No. 7,126,877 to Barger, et al. discloses a system and method that uses an antenna with a spherical array of seven sensors to detect a projectile shock wave cone 33 and compute the projectile trajectory.

Other prior known systems and method use both the muzzle blast and shock wave to locate the origin of a gunshot. U.S. Pat. No. 7,359,285 to Barger, et al. discloses a system and method that uses an antenna similar to that used in the '877 patent, and further uses the muzzle blast to calculate the origin of a gunshot. U.S. Pat. No. 6,178,141 to Duckworth et al. discloses a system and method that utilize the shock wave to calculate the projectile trajectory and the muzzle blast to locate the origin of a gunshot. Duckworth et al. discloses using at least six distributed individual microphone nodes or at least two nodes with three microphones each. In Duckworth et al. the caliber of the projectile is first estimated, and a ballistic coefficient and thereby the deceleration are then estimated based on the caliber estimate. The ToAs or TDoAs from the nodes are then used to calculate the projectile trajectory.

Systems and methods that use several closely spaced sensors may be placed in a disadvantaged location and receive only reflected and/or corrupted signals. A distributed network of sensors is more likely to receive clean, direct acoustic signals at enough nodes to reliably calculate the origin and trajectory of a gunshot projectile. Additionally, array-based systems and methods require precise orientation of the sensor array in order to find the angle of arrival of the shock wave. The array-based systems and methods require proper calibration in order to provide an accurate angle of arrival. Prior known systems and methods that use distributed sensor networks do little processing at each node and transmit entire waveforms to a base station for processing. Limited wireless bandwidth in such systems limits the number of nodes and slows transmission of data to the base station, which prevents real-time location finding of the shooter.

DISCLOSURE OF THE INVENTION

A system for determining the origin of a gunshot and the trajectory of the projectile from the gunshot includes a plurality of spaced sensor nodes and a base station that is in wireless communication with the sensor nodes. Each node has an acoustic sensor, a processor, a positioning device and a wireless communications device. The base station has a processor and wireless communications device. A method for determining the origin and trajectory of a gunshot includes the steps of, at the nodes, sensing acoustic signals, converting the acoustic signals into digital signals, separating the digital signals into segments including a main shock wave segment, a main muzzle blast segment and/or other segments, calculating a ToA of each segment, and extracting features from each segment, and then at the base station identifying each ToA as a main shock wave or a main muzzle blast ToA from the features, and computing the trajectory from the main shock wave ToAs. The computed trajectory includes velocity and acceleration. The method also includes computing, at the base station, the origin of the gunshot from the main muzzle blast ToAs.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
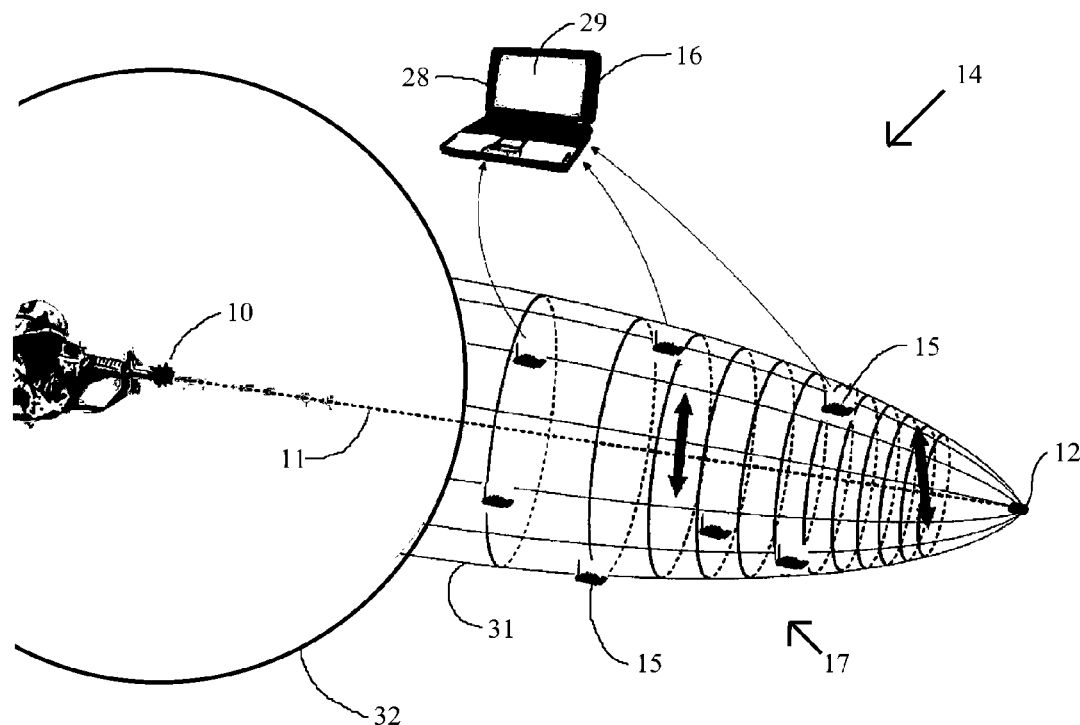
FIG. 1 is a perspective view of a gunshot locating system embodying features of the present invention.
Figure 2:
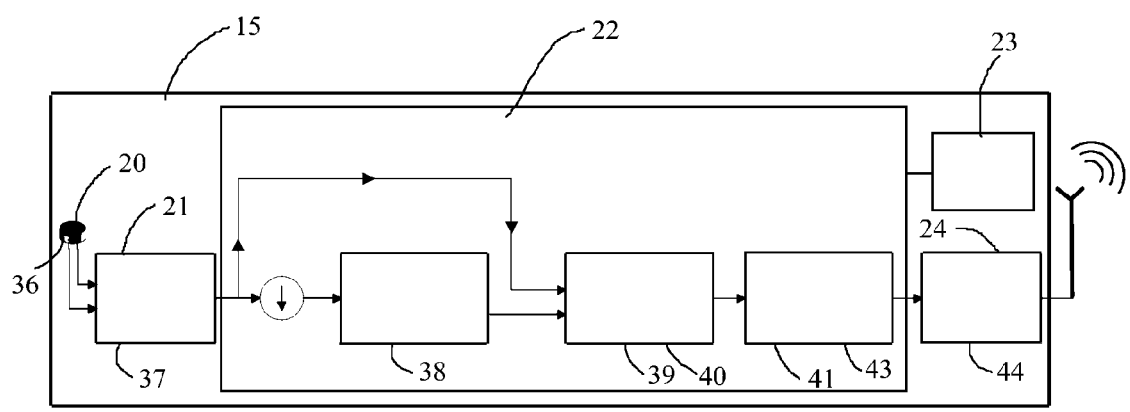
FIG. 2 is a block diagram of a node of the system of FIG. 1.
Figure 3:
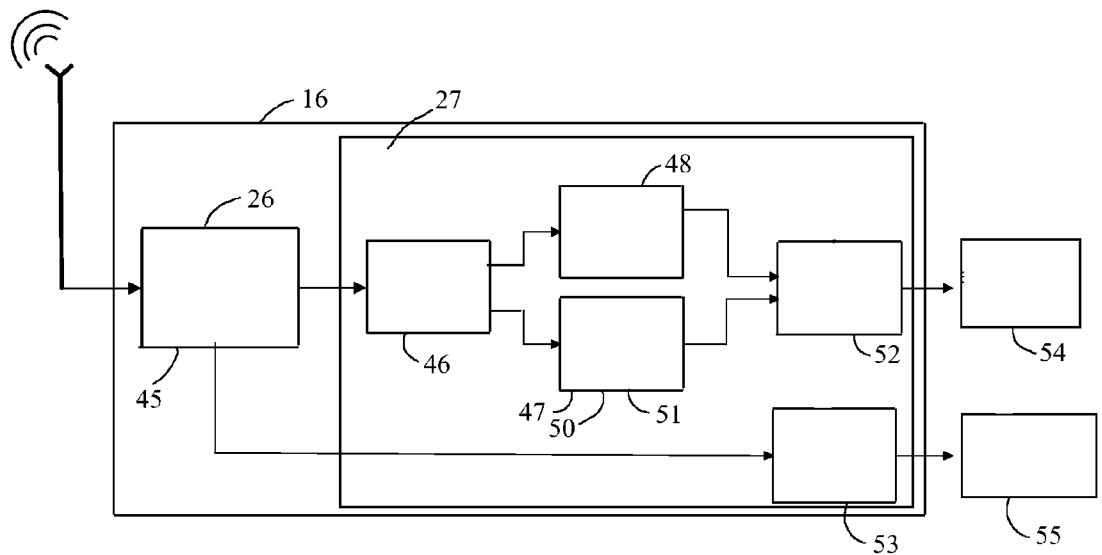
FIG. 3 is a block diagram of a base station of the system of FIG. 1.

Referring to FIGS. 1 to 3, a system for determining the gunshot origin 10, or shooter position, and the trajectory 11 of a projectile 12 from a gunshot, embodying features of the present invention, includes a distributed wireless sensor network 14 having a plurality of sensor nodes 15 and a base station 16 in wireless communication with the sensor nodes 15. The sensor nodes 15 can be organized into one or more clusters 17.

Each sensor node 15 has a microphone or acoustic sensor 20, an analog to digital converter 21, a processor 22, a positioning device 23 and a wireless communication device 24. By way of examples, and not as limitations, the processor 22 could be a Field Programmable Gate Array (FPGA) and the positioning device 23 could be a Global Positioning System (GPS) device. Time synchronization at each sensor node 15 can be achieved using either the on-board GPS, when present, or any software-based time synchronization scheme such as Flooding Time Synchronization Protocol.

The base station 16 includes a wireless communication device 26 and a processor 27. The base station 16 could be incorporated into a laptop computer 28 and preferably has a display 29 for displaying the origin 10 and the trajectory 11 of a gunshot.

A method for determining the origin 10 and trajectory 11 of a gunshot, embodying features of the present invention, begins with providing the sensor nodes 15 and the base station 16 in communication with the sensor nodes 15. FIG. 2 shows the steps of the method that are performed at each sensor node 15, including sensing acoustic signals 36, converting the acoustic signals to digital signals 37, detecting a gunshot in the digital acoustic signals 38, separating a main shock wave segment from a main muzzle blast segment, when both exist, in the digital acoustic signals 39, calculating a ToA for the main shock wave segment and a ToA for the main muzzle blast segment 40, and extracting features from the segments 41.

Acoustic signals from the acoustic sensor 20 are sampled at 1 MHz by the analog to digital converter 21. In the step of detecting 38, the digital signals from the analog to digital converter 21 are down-sampled to 16 kHz to produce down-sampled signals. The step of detecting includes feeding the down-sampled signals in to a Hidden Markov Model-based detector on the down sampled signals.

In the Hidden Markov Model-based detector, gunshot event detection can be viewed as a binary hypothesis testing problem given as, $$H0: x(k) = v(k)  1 \leq k \leq n$$

$$H1: \begin{cases} x(k) = v(k) & 1 \leq k < n_0 \\ x(k) = z(k) & n_0 \leq k \leq n \end{cases}$$

where $x(k)$ is the observed signal, $v(k)$ and $z(k)$ are the signals without and with a gunshot signal, and $n_0$ is the onset or ToA of the gunshot event under hypothesis H1. No specific assumption is made about the probability density functions of the observations under null H0 hypothesis and the gunshot present H1 hypothesis. However, it is assumed that under H1 the gunshot signal and background noise are statistically independent.

The Hidden Markov Model-based detector requires prior computation of two transitional probability matrices and two observation or emission probability matrices, one for each of the H1 and H0 hypothesis using actual gunshots and other noise such as wind noise or other transient signals. Once these are computed and stored on the sensor node 15, the Hidden Markov Model-based system implements a two-step algorithm. In the first step, the scaled forward variables are computed. In the second step the running cumulative log-likelihood ratio, that is used for detection and ToA estimation, is computed. If the value of the cumulative log-likelihood ratio at the previous iteration is less than zero, then the scaled forward variables are reinitialized, else the scaled forward variables are updated recursively. After computing the scaled forward variables for the two hypotheses, the log-likelihood ratio is computed. The cumulative log-likelihood ratio is also updated as a cumulative sum of the log-likelihood sum up to the previous iteration plus the log-likelihood ratio of the current iteration. The change or gradient of the cumulative log-likelihood ratio is also compared against a pre-selected, experimentally determined threshold. If the gradient of the cumulative log-likelihood ratio for a new sample is higher than the threshold then detection of a gunshot signal is declared. The index of the sample estimated to be the start of the detected gunshot signal is the first time index for which the threshold is exceeded.

The onset of the gunshot signal is characterized by a sharp increase in the gradient of the cumulative log-likelihood ratio in the Hidden Markov Model detector. There may be more than one sample in the transient data where the gradient of the cumulative log-likelihood ratio is over a pre-specified threshold. The ToA typically corresponds to the first sample where the gradient of the cumulative log-likelihood ratio exceeds the threshold.

If the processor 22 used in the sensor node 15 is a FPGA, the Hidden Markov Model-based detector can be modified to allow faster, more efficient, and more accurate implementation. Since the evaluation of the logarithm in the FPGA is slow, requiring the use of a costly iterative algorithm, the logarithm operation in the log-likelihood calculations can be replaced by likelihood calculations. The removal of the logarithm frees up a considerable amount of resources on the FPGA. Additionally, since the entries of the observation, transition and prior probability matrices or vectors in the Hidden Markov Model-based detector algorithm are much less than unity, underflow occurs when computing the forward variables in the Hidden Markov Model-based detector algorithm due to the multiplication of very small numbers, resulting in even smaller numbers. The occurrence of underflow can be reduced by shifting the inputs to these operations higher in the floating point representation's dynamic range. As a result of shifting the inputs, the output of these operations is also shifted higher in the floating point representation's dynamic range. This can be done without causing additional overflow because the range of numbers greater than one is not being used.

After a gunshot is declared in the step of detecting 38, the step of separating 39 begins by buffering a window of the digital acoustic signals around the sample identified as the start of the gunshot signal. Two buffers are used. The first buffer is updated to hold the last 10,000 time series samples. After detection occurs, the 10,000 previously stored samples are copied to a big buffer which will store a total of $2^{16}$=65,536 samples. This large buffer will allow the entire gunshot signal sampled at 1 MHz to be captured. Samples are stored in this large buffer until it is full.

The next substep in the step of separating is to feed the stored 65,536 samples to a Hidden Markov Model-based routine to find the index of the sample which accurately identifies the start of the gunshot signal. When both the shock wave 31 and muzzle blast 32 are present, the shock wave 31 will arrive first. Marking the beginning of the second transient segment that corresponds to the muzzle blast 32 can be tricky, as there are typically several samples of the gradient of the cumulative log-likelihood ratio that are over the selected threshold. The gradient of the cumulative log-likelihood ratio is smoothed out using a moving average filter and then the beginning and end of each segment that exceeds the selected threshold is marked based on the averaged gradient of the cumulative log-likelihood ratio.

If the moving average window length is too large, the end of the first transient and the beginning of the second transient will both lie within the moving average window, and the end of the first transient cannot be detected. If the window length is too small, a single observed transient signal could be split into more than one segment. The length of the MA window could be systematically determined using the Receiver Operating Characteristics curve. The Receiver Operating Characteristics curve is a plot of the probability of true positives versus the probability of the false positives, where true positive represents the condition when both shock wave 31 and muzzle blast 32 are present and the process picks up both of the shock wave 31 and muzzle blast 32, and false positive represents the condition when the process picks up two segments when only one of the shock wave 31 or muzzle blast 32 is present. The Receiver Operating Characteristics curve can be generated based on training data that covers cases with both shock wave 31 and muzzle blast 32 as well as shock wave 31 or muzzle blast 32 alone. The smallest moving average window size that gives a point corresponding to true positive probability of 98% and false positive probability of 2.5% is chosen as the optimum.

The steps involved in separating the buffered digital signal into more than one transient segment, where the gradient of the cumulative log-likelihood ratio is denoted as LLR', are:

1. Compute LLR'(t) based on the data observation at time t.
2. Perform Nth order averaging of LLR' with weights 1/N, $$y(t) = \frac{1}{N} \sum_{\tau=0}^{N-1} LLR'(t-\tau)$$

3. Let θ be a pre-specified detection threshold. If y(t)<θ, set t=t+1 and go to step(1), else continue to the next step.
4. y(t)>θ indicates that the ToA is between $\{t-\tau\}_{\tau=0}^{N-1}$. Set $t_{start}$ to be the time index of the first sample of $\{LLR'(t-\tau)\}_{\tau=0}^{N-1}$ that is over θ, $t_{start}=\arg\min_{t-\tau}\{LLR'(t-\tau)>\theta\}_{\tau=0}^{N-1}$ 5. Once the $t_{start}$ is estimated, compute y(t) for subsequent observations until y(t)<0. When this condition is met, it indicates the end of the transient.
6. Set the time the transient ended, $t_{end}$, to be the time index of the last sample of $\{LLR'(t-\tau)\}_{\tau=0}^{N-1}$ that is over θ, $t_{end}=\arg\max_{t-\tau}\{LLR'(t-\tau)>\theta\}_{\tau=0}^{N-1}$ 7. The identified transient segment between $t_{start}$ and $t_{end}$ is assigned a score based on the average of y(t) values within the transient segment, $$s = \frac{1}{t_{end} - t_{start} + 1} \sum_{t=t_{start}}^{t_{end}} y(t).$$

When the shooter location is close to the sensor node, due to the strong signal strength, the moving average of the gradient of the cumulative log-likelihood ratio may not be smooth enough which might result in more than one transient segment being detected. In such cases, the transient segments are arranged in the descending order based on the score s. The first segment is selected as the main shock wave segment and the second segment is selected as the main muzzle blast segment. The rationale for using this approach is that the transient segments corresponding to shock wave 31 and muzzle blast 32 are usually very strong compared to the other segments corresponding to the false transients that could also be detected. The entire process is implemented on the FPGA of each sensor node.

8. Repeat steps (1) through (7) over the buffered data to detect both the shock wave 31 and muzzle blast 32 transient.

The step of calculating a ToA for the main shock wave segment and for the main muzzle blast segment 40 includes selecting the $t_{start}$ for the main shock wave segment and the $t_{start}$ for the main muzzle blast segment. The step of extracting features from the segments 41 includes capturing a Hidden Markov Model state propagation sequence. The step of extracting features from the segments 41 can include constructing a feature vector 43 from a Hidden Markov Model state propagation sequence for the segment.

When a gunshot is fired from a certain distance, a sensor node 15 could observe either shock wave 31 or muzzle blast 32 or both, depending on the line of sight to shooter location and the angle of fire. The physical phenomena generating the acoustic shock wave 31 and muzzle blast 32 transient events are widely different. When there are two transient segments observed at a given node, the ToAs of the first and second transient segments typically correspond to shock wave 31 and muzzle blast 32, respectively. When only one transient segment is observed, identifying whether the underlying transient segment is that of a shock wave 31 or a muzzle blast 32 becomes important.

The acoustic recording of the shock wave 31 has a very unique characteristic shape which can be used to discriminate between shock wave 31 and muzzle blast 32. The shock wave signature is characterized by a sudden rise in pressure, followed by steady decrease in pressure and then sudden return to normal pressure, resembling an N-wave. Several factors, including the speed of the projectile 12, the perpendicular distance from the projectile trajectory 11 to the sensor node 15, the length and diameter of the projectile 12, influence the rise time and the length of the N-wave. The shock wave signature, characterized by the N-wave, the muzzle blast signature, or any unrelated false transient event, such as a door slam, are dissimilar and have dissimilar Hidden Markov Model state propagation sequences. The state propagation sequences are captured by the scaled forward variables that are computed for every sample of the time series over the detected transient segment. At each sensor node 15 an aggregated state feature vector can be extracted from the computed scaled forward variables for all the states.

The substep of constructing a feature vector 43 begins with identifying, for the observation at time t, the estimated current state $\hat{q}_t$ of the Hidden Markov Model as, $$\hat{q}_t = \arg\max_i \alpha'_t(i|H_1)$$

where $\alpha'_t(i|H_1)$ is the scaled forward variable computed during the Hidden Markov Model process in the step of separating 39 and the estimated state $\hat{q}_t$ is one of the N number of possible states $S_i$, $i \in [1,N]$. Given the detected transient segment between the interval $t_{start}$ and $t_{end}$, a set of state sequences $\hat{Q} = \{\hat{q}_t\}_{t_{end}}^{t_{start}}$ can be estimated using the above equation. From $\hat{Q}$ a set of state transition probabilities represented by the matrix $\hat{A} = [\hat{a}_{ij}]$ can be estimated over the detected transient segment. By definition, $a_{ij} = P(q_t = S_j | q_{t-1} = S_i)$ with $q_t$ being the state visited at time t and $S_i$ is the state i. Thus, $\hat{a}_{ij}$ can be computed as, $$\hat{a}ij = \frac{\text{Number of state transitions in } \hat{Q} \text{ from } \hat{q}_{t-1} = s_i \text{ to } \hat{q}_t = s_j \text{ over } t_{end} - t_{start}}{|\hat{Q}|}$$

where the operator | | represents the cardinality of the set. The feature vector $f \in \mathbb{R}^N$ representing the detected transient segment is, $f = [\hat{a}_{11}\ \hat{a}_{22}, \ldots, \hat{a}_{NN}]$, an N-dimensional feature vector that is constructed using the diagonal elements of the matrix $\hat{A}$. The dimension N can be any value. By way of example, and not as a limitation, N=10 can be used.

After the substep of constructing a feature vector 43, the next step at each sensor node 15 is transmitting the observed TOAs for each segment and the aggregated feature vector 44. Alternatively, a simple classification system such as minimum distance classifier can be implemented on the processor 22 on each sensor node 15 to determine the type of each transient. In this case, a class label, instead of feature vector, is transmitted along with the observed ToAs.

The first step performed at the base station 16, as shown in FIG. 3, is receiving the observed TOAs and the feature vector 45 from the sensor nodes 15. The next steps of the method that are performed at base station 16, include identifying each ToA 46 as one of a main shock wave or a main muzzle blast ToA from the features, and computing the trajectory 47 from the main shock wave ToAs. The computed trajectory 11 includes the velocity and acceleration of the projectile 12. The method can also include the step of computing the origin 48 of the gunshot from the main muzzle blast ToAs, when the main muzzle blast ToAs are available. The step of identifying each ToA 46 as one of a main shock wave or a main muzzle blast ToA uses a classifier, such as a neural network, that labels whether the ToA corresponds to a shock wave 31 or to a muzzle blast 32 or to a unrelated false transient.

The step of computing the trajectory 47 includes the substeps selecting a reference node 50 and calculating the trajectory 51 from an observed TDoA for the main shock wave segment for each node relative to the reference node. The substep of calculating the trajectory 51 from an observed TDoA includes minimizing a cost function based on errors between the observed TDoA for the nodes and TDoAs for the nodes generated from a model.

The model provides that a theoretical main shock wave ToA is the sum of a time of the gunshot, a time for a projectile 12 to travel from the origin 10 of the gunshot to a shock wave source point and a time for a shock wave 31 to travel from the shock wave source point to the sensor node 15, and the theoretical main shock wave ToA is a function of the origin 10 of said gunshot, the position of the sensor node 15, the trajectory angle for the projectile 12, the initial velocity of the projectile 12 and the acceleration of the projectile 12.

When a bullet travels at supersonic speed, the acoustic wavefronts lag behind the supersonic projectile 12 in a cone-shaped region with the projectile 12 at the vertex and the edge of the cone forming a supersonic wavefront called the shock wave 31. The shock wave 31 from a supersonic projectile 12 is a shock wave cone 33 composed of overlapping spherical wavefronts. FIG. 1 illustrates the cone-shaped wavefront for the shock wave 31 and a spherical wavefront for the muzzle blast 32 and a distributed sensor network. As any one of these wavefronts forms, the wavefront propagates radially outward at the speed of sound c and acquires a radius ct in time t. At the same time the bullet, traveling at velocity v moves forward a distance of vt. These two displacements form the leg and hypotenuse, respectively, of a right triangle that can be used to determine the shock wave cone angle $$\theta = \sin^{-1}\left(\frac{c}{v}\right)$$

at the vertex of the shock wave cone 33.

Figure 4:
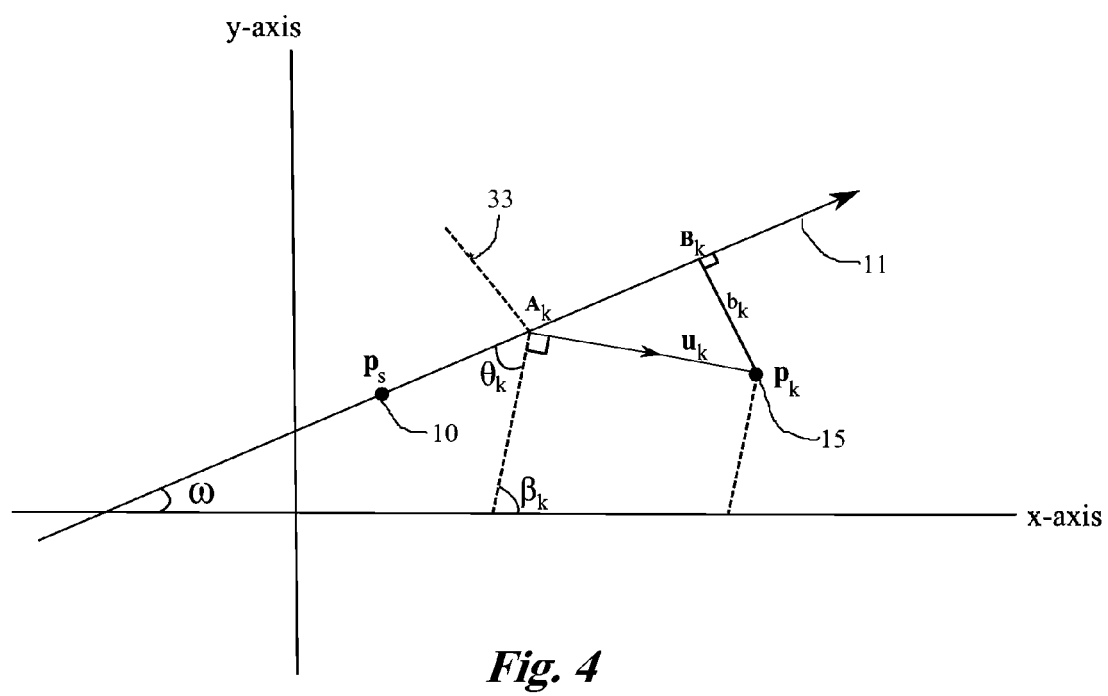
FIG. 4 is a drawing of gunshot shock wave propagation.

The geometry of the bullet trajectory 11 and the shock wave 31 propagation is shown in FIG. 4, where $p_k = [x_k, y_k]^T$ denotes the location vector of the $k^{th}$ node, $k \in [1,K]$ where K is the total number of nodes. The shooter location is denoted by the vector $p_s = [x_s, y_s]^T$ and the angle that the bullet trajectory 11 makes with the x-axis of the reference frame by $\omega$. The shock wave 31 that reaches the kth node originated at point $A_k$, called the shock wave source point for the kth node. The shock wave cone angle at location $A_k$ is $$\theta_k = \sin^{-1}\left(\frac{c}{v_k}\right)$$

where c is the speed of sound in air and $v_k$ is the speed of the bullet at source point $A_k$. Thus, the shock wave Angle of Arrival (AoA), $\beta_k$, at the kth node is, $\beta_k = \omega + \varsigma \theta_k$, where $\varsigma$ could take three possible values, namely 1, −1, and 0, for cases where node k is to the right, left or on the bullet trajectory 11, respectively. Assume $\varsigma = 1$. The shock wave and muzzle blast ToA at the kth node could be denoted by $t_{k,s}$ and $t_{k,m}$, respectively. The shock wave ToA could be written as the sum of the time of shot $t_s$, time $t_{1,k}$ taken for the bullet to reach the source point $A_k$ and the time $t_{2,k}$ taken for the wavefront to travel from $A_k$ to $p_k$, or $t_{k,s} = t_s + t_{1,k} + t_{2,k}$, and the muzzle blast ToA, on the other hand, can be expressed as $t_{k,m} = t_s + (\|p_k - p_s\|)/c$ where $\|x\|$ represents Euclidean norm of vector x.

Figure 5:
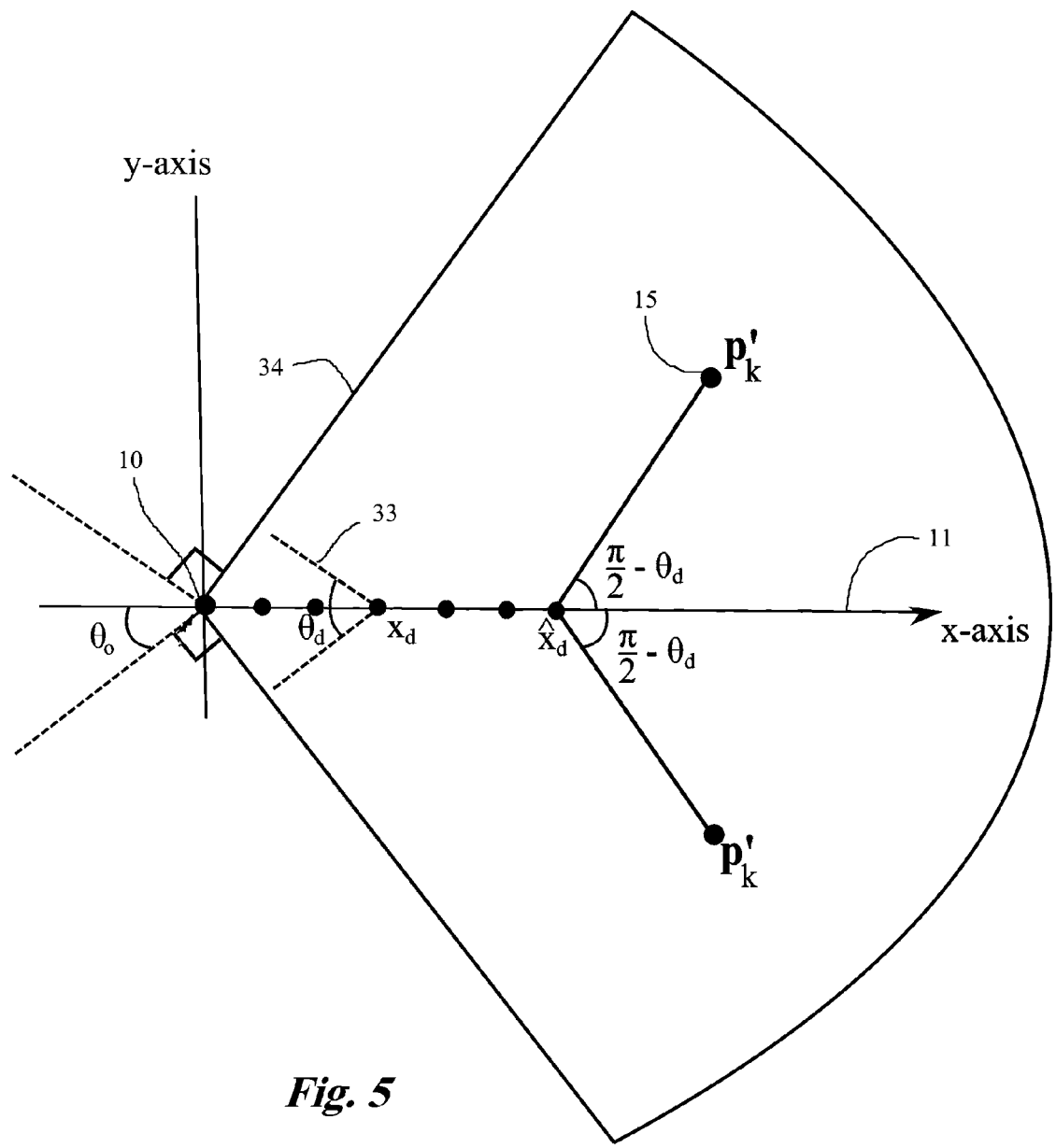
FIG. 5 is a drawing of the shock wave propagation of FIG. 4, with the shooter position translated to the origin and the projectile trajectory rotated to be along the x axis.

FIG. 5 shows the geometry of the bullet trajectory 11 and the shock wave propagation rotated and translated such that the gunshot origin 10 is at the origin and the projectile trajectory 11 is along the x-axis. The sensor node has to be in the field of view 34 or zone of the shock wave cone 33 to receive the shock wave 31. The new sensor location $p'_k=[x'_k, y'_k]^T$ becomes $p'_k=R(\omega)(p_k-p_s)$ where $R(\omega)$ is the clockwise rotation matrix $$R(\omega) = \begin{bmatrix} \cos(\omega) & \sin(\omega) \\ -\sin(\omega) & \cos(\omega) \end{bmatrix}.$$

The shock wave source point for the $k^{th}$ node is $(x_d, 0)$. The time for the bullet to travel from the shooter location or gunshot origin 10 to the hypothesized shock wave source point, $t'_{1,k}$ is:

$$t'_{1,k} = \frac{-2v_0 + \sqrt{4v_0^2 + 8\alpha x_d}}{2\alpha}$$

where $v_o$ is the initial velocity of the projectile 12, $x_d$ is the distance from the origin 10 of the gunshot to the assumed or hypothesized shock wave source point, and $\alpha$ is the acceleration of the projectile 12. Since the bullet is decelerating, $\alpha<0$.

The velocity at $x_d$ is $$v_d = \frac{x_d}{t'_{1,k}} + \frac{\alpha t'_{1,k}}{2},$$

and the shock wave cone angle is $\theta_d = \sin^{-1}(c/v_d)$. The slope of a line normal to the shock wave cone 33 is: $m = \pm\tan(\pi/2-\theta_d)$, depending on whether the sensor node is in the first or fourth quadrant. A line with slope m through the $k^{th}$ node intersects the x axis at $\hat{x}_d = x'_k - y'_k/m$. The shock wave source point is iteratively evaluated starting from $x_d=0$, in 1 cm increments. When $|x_d - \hat{x}_d|<1$ cm, $(x_d, 0)$ is labeled as the true shock wave source point. The shock wave ToA can be computed as the sum of the time taken by the bullet to travel from the shooter location to the shock wave source point and the time taken by the shock wave 31 to propagate from the source point to the node location, $$t_{k,s} = t_s + t'_{1,k} + \frac{\sqrt{(x_k - x_d)^2 - y_k^2}}{c}$$

The models that generate shock wave and muzzle blast ToAs could be denoted by functions $T_{sw}$ and $T_{mb}$, respectively with: $t_{k,s}=T_{sw}(p_k, p_s, \omega, v_o, \alpha, c)$ and $t_{k,m}=T_{mb}(p_k, p_s, c)$ Since the time of shot $t_s$ affects the shock wave and muzzle blast ToAs equally, $t_s$ is not used as one of the variable in these functions. The dependence of $t_s$ on the shock wave ToAs can be eliminated by considering the shock wave TDoA between any node and a reference node. By way of example, and not as a limitation, the reference node can be selected as the sensor node 15 whose ToA is the median of all the observed ToAs. The shock wave TDoA $\tau_{k,r}$ between the kth node and the reference node r is, $\tau_{k,r}=T_{sw}(p_k, p_s, \omega, v_o, \alpha, c)-T_{sw}(p_r, p_s, \omega, v_o, \alpha, c)$.

If both the shock wave and muzzle blast ToAs are available, the muzzle blast ToAs could be used to estimate the shooter location $\hat{p}_s$. The estimated shooter location and the observed shock wave ToAs can subsequently be used to estimate the trajectory parameters. Let $\hat{t}_{k,s}$ be the shock wave ToA observed at the kth node and $\hat{\tau}_{r,k}=\hat{t}_{k,s}-\hat{t}_{r,s}$ be the observed shock wave TDoA between kth node and reference node r.

Due to factors such as sensor location error, time synchronization error, TDoA estimation error, the theoretical shock wave TDoA at each sensor may differ from the observed shock wave TDoA by the error $e_{k,r}=\hat{\tau}_{k,r}-\tau_{k,r}$. The theoretical shooter location $p_s$ is replaced with the shooter location $\hat{p}_s$ calculated from the muzzle blast ToAs and $e_{k,r}(p_s, \omega, v_o, \alpha)=\hat{\tau}_{k,r}-[T_{sw}(p_k, \hat{p}_s, \omega, v_o, \alpha, c)-T_{sw}(p_r, \hat{p}_s, \omega, v_o, \alpha, c)]$. Modeling the shock wave TDoA error as a random variable with Cauchy distribution, the Maximum-Likelihood estimates of the angle of fire $\hat{\omega}$, initial bullet velocity $\hat{v}_0$ and the bullet deceleration $\hat{\alpha}$ are obtained by solving the optimization problem with the cost function: $(\hat{\omega}, \hat{v}_o, \hat{\alpha}) = \arg\min_{(\omega, v_0, \alpha)} \tau_{k=1}^K \log(1+e_{k,r}^2(\omega, v_0, \alpha))$.

An additional constraint could be introduced in the search for the trajectory parameters based on the fact that the sensor nodes 15 that observed a valid shock wave ToA should be within the field of view 34 of the shock wave cone 33. During the search for the trajectory parameters, the angle of fire $\omega'$ is a candidate in the search if, $|\text{angle}(p'_k)|-(90-\theta_0) \leq 0$, where $p'_k=R(\omega')(p_k-\hat{p}_s)$ and $R(\omega')$ is the clockwise rotation matrix of angle $\omega'$.

MATLAB is a programming language and numerical computing environment developed by MathWorks, Inc. MATLAB includes an optimization toolbox with minimization functions, including the function fmincon. By way of example, and not as a limitation, the function fmincon can be used to minimize the above cost function subject to above constraint.

Figure 6:
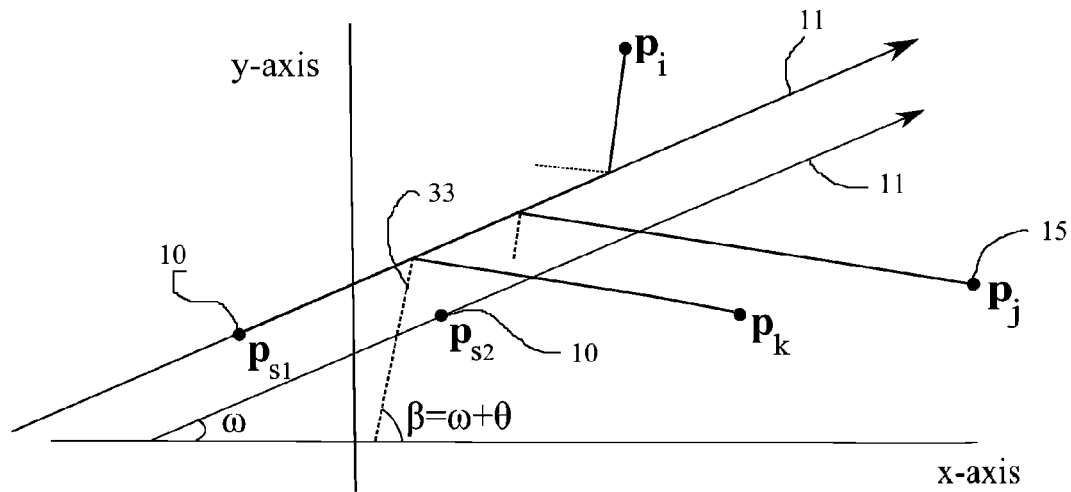
FIG. 6 is another drawing of gunshot shock wave propagation, where the projectile trajectory is over a cluster of sensor nodes.
Figure 7:
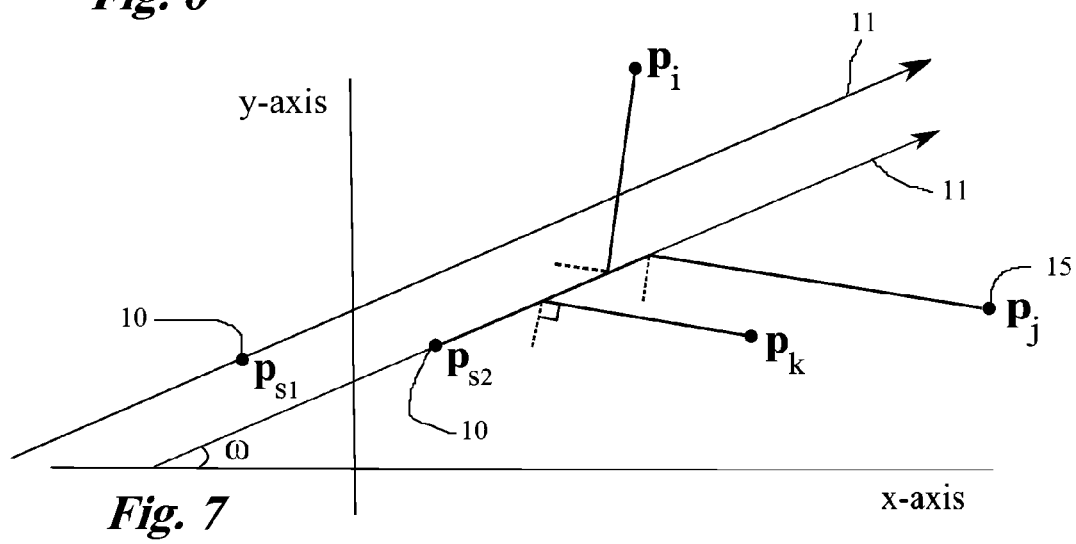
FIG. 7 is another drawing of gunshot shock wave propagation, where the projectile trajectory is over a cluster of sensor nodes.

As shown is FIGS. 6 and 7, the trajectory 11 can be uniquely determined only if the trajectory 11 passes over the cluster 17 of sensor nodes 15. In FIG. 6 a gunshot is fired from point $p_{s1}$ and in FIG. 7 a gunshot is fired from point $p_{s2}$, with the trajectories being parallel. The $i^{th}$ sensor node 15 is to the left of the trajectories, and the $j^{th}$ and $k^{th}$ sensor nodes 15 are to the right of the trajectories. The TDoA between the $j^{th}$ and $k^{th}$ sensor nodes 15 will be the same for both trajectories. However, the trajectory 11 can be uniquely determined with the addition of the TDoAs between the $i^{th}$ sensor node 15, and the $j^{th}$ and $k^{th}$ sensor nodes 15.

Since $\omega$ cannot be uniquely determined when the trajectory is to the left or right of the sensor node cluster, in such cases, the estimated angle of fire $\hat{\omega}$ obtained by minimizing the cost function above might indicate that the trajectory is over the array. In order to mitigate this problem, the cost function is minimized with three different initial choices of $\omega_{init}$, an $\omega_{init}$ to the left, right and over the cluster. The trajectory parameter estimates that give the smallest cost function for the three choices of initial conditions are chosen as the final estimate.

Figure 8:
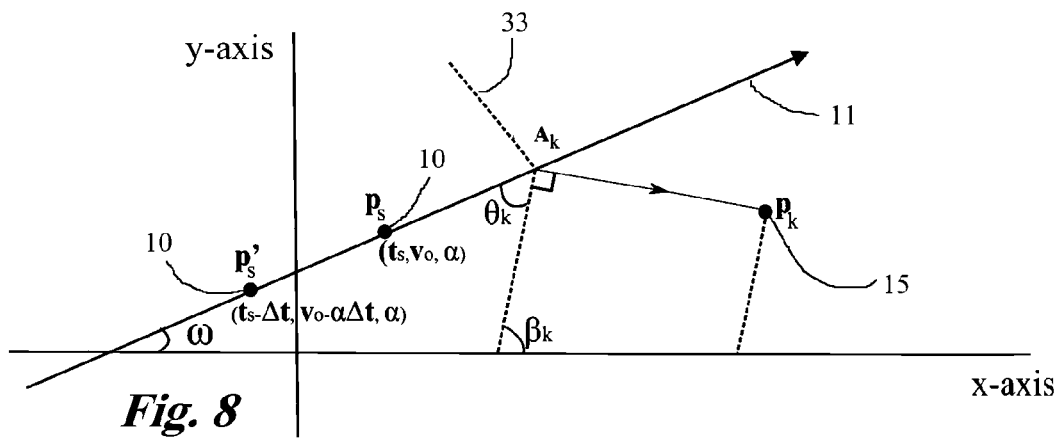
FIG. 8 is another drawing of gunshot shock wave propagation, showing two possible origins for a gunshot fired along the same trajectory.

When only the shock wave ToAs are available, the shooter location cannot be uniquely determined. FIG. 8 shows a gunshot trajectory 11 with two possible positions for the origin 10 of the gunshot, ps and ps'. The shock wave ToAs observed at a cluster of nodes when a shot is fired at time ts, from location ps and with the initial bullet velocity $v_o$ would be the same as when the shot is fired at time ts$-\Delta$t, from location $p_s'$ and with the initial bullet velocity of vo$-\alpha\Delta$t. The time of shot is usually unknown and needs to be estimated along with the other trajectory parameters. Thus, there are theoretically infinite shooter locations along the bullet trajectory 11 that can generate the same ToA measurements. In absence of muzzle blast ToAs, assuming that the trajectory 11 is over the sensor cluster 17, the cost function could be set up using the error model to estimate the trajectory parameters and a shooter location somewhere along the trajectory 11 as $(\hat{\omega}, \hat{v}_o, \hat{\alpha}) = \arg\min_{(\omega, v_0, \alpha)} \tau_{k=1}^K \log(1+e_{k,r}^2(p_s, \omega, v_0, \alpha))$.

The search process is sensitive to the initial choice of the angle of fire. To avoid the optimization algorithm getting stuck in a local minimum, various initial values for the angle of fire are chosen and the final solution is chosen based on the one that gives the smallest cost. Instead of randomly choosing the initial values, the initial $\omega_{init}$ is chosen in increments of 18° starting from 0° going up to 360°, thus there are twenty trials. This increment is chosen based on experiments with simulated data. In each trial of $\omega_{init}$, the shooter location is arbitrarily chosen at some reasonable distance such as 50-300 m from the center of the node cluster and along the trajectory with an initial angle $\omega_{init}$. The initial values of $v_o$ and $\alpha$ are chosen to be 440 m/s and 50 m/s$_2$, respectively. These initial values are kept constant for each trial. After twenty trials, the set of trajectory parameter estimates that gave the smallest cost function is chosen as the final estimate. The results of our recent studies on real data sets indicated that even when only the shock wave ToAs are available, the angle of fire could be accurately estimated within 2 degrees accuracy even at long ranges such as 260 m.

The next step of the method performed at the base station 16 is fusing the data 52 from the steps of computing the trajectory 47 and computing the origin 48, to update the gunshot origin 10 and trajectory 11. The method performed at the base station 16 can also include a step of estimating the caliber 53 of the projectile 12 from the features extracted from the main shock wave segment and from the estimated caliber classifying the weapon that was fired. The final steps of the method performed at the base station 16 are displaying the origin and trajectory 54 and displaying the weapon type and caliber 55 on the display 29.

Referring again to FIG. 2, the processor 22 in each sensor node 15, combined with software or firmware instructions provides a means for detecting a gunshot in the acoustic signals, a means for separating the acoustic signals into segments including a main shock wave segment, a main muzzle blast segment and other segments, a means for calculating a ToA of each segment, and a means for extracting features from each segment. The processor 27 at the base station 16, in FIG. 3, combined with software or firmware instructions provides a means for identifying each ToA as one of a main shock wave and a main muzzle blast ToA from the features, a means for computing the trajectory 11 of a gunshot from the main shock wave ToAs, and a means for computing the origin 10 of a gunshot from the ToAs for the main muzzle blast segments.

Although the present invention has been described with a certain degree of particularity, it is understood that the present disclosure has been made by way of example and that changes in details of structure may be made without departing from the spirit thereof.

What is claimed is:

1. A method for finding the trajectory of a gunshot projectile from acoustic signals, comprising the steps of:
   providing a plurality of spaced, distributed sensor nodes and a base station in communication with said nodes,
   sensing said acoustic signals at said nodes,
   converting said acoustic signals into digital signals at said nodes,
   separating, at said nodes, said digital signals into segments including at least one of a main shock wave segment, a main muzzle blast segment and other segments,
   calculating, at said nodes, a time of arrival of each said segment,
   extracting, at said nodes, features from each said segment,
   identifying, at said base station, each said time of arrival as one of a main shock wave and a main muzzle blast time of arrival from said features, and
   computing, at said base station, said trajectory from said main shock wave times of arrival, said trajectory including velocity and acceleration, including the substeps of selecting a reference node and calculation said trajectory from an observed time difference of arrival for said main shock wave segment for each node relative to said reference node, and said substep of calculating said trajectory including minimizing a cost function based on errors between said observed time differences of arrival for said nodes and theoretical time differences of arrival for said nodes generated from a model.

2. The method as set forth in claim 1 further comprising the step of computing, at said base station, an origin for said projectile from said main muzzle blast times of arrivals.

3. The method as set forth in claim 1 wherein said model provides that a theoretical main shock wave time of arrival is the sum of a time of said gunshot, a time for a projectile to travel from an origin of said projectile to a shock wave source point and a time for a shock wave to travel from said shock wave source point to said node, and said theoretical main shock wave time of arrival is a function of said origin of said projectile, the position of said node, a trajectory angle for said projectile, an initial velocity of said projectile and an acceleration of said projectile.

4. The method as set forth in claim 3 wherein said time for said projectile to travel from said origin of said projectile to said shock wave source point equals:

$$\frac{-2v_0 + \sqrt{4v_0^2 + 8\alpha x_d}}{2\alpha}$$

where v0 is said initial velocity of said projectile, xd is an assumed distance from said origin of said gunshot to said shock wave source point, and $\alpha$ is said acceleration of said projectile.

5. The method as set forth in claim 4 wherein xd is evaluated iteratively from xd=0, in a selected interval, relative to the intersection of said trajectory with a line that passes through said node and is normal to a shock wave cone.

6. The method as set forth in claim 1 further comprising the step of detecting, at said nodes, a gunshot in said digital acoustic signals.

7. The method as set forth in claim 6 wherein said step of detecting a gunshot includes the substeps of down-sampling said digital signals to produce down-sampled signals and then applying a Hidden Markov Model based detector to said down-sampled signals.

8. The method as set forth in claim 7 wherein said acoustic signals are down-sampled at 16 KHz in said substep of down-sampling.

9. The method as set forth in claim 1 wherein said acoustic signals are sampled at 1 MHz in said step of converting.

10. The method as set forth in claim 9 wherein said step of separating includes the substep of applying a Hidden Markov Model to said digital signals.

11. The method as set forth in claim 10 wherein said step of separating includes the substeps of applying a moving average filter to a gradient of a cumulative likelihood ratio of samples of said digital signal, selecting segments from said digital signal with a moving average greater than a selected threshold, sorting said selected segments in descending order, and choosing a first selected segment as said main shock wave segment and a second selected segment as said main muzzle blast segment.

12. The method as set forth in claim 1 wherein said step of extracting features includes the substep of constructing a feature vector from a Hidden Markov Model state propagation sequence for said segment.

13. A method for finding the trajectory of a gunshot projectile from acoustic signals, comprising the steps of:
provichnig a plurality of spaced, distributed sensor nodes and a base station in communication with said nodes,
sensing said acoustic signals at said nodes,
converting said acoustic signals into digital signals at said nodes, said acoustic signals being sampled at 1 MHz,
detecting, at said nodes, a gunshot in said digital acoustic signals, said step of detecting a gunshot including the substeps of down-sampling said digital signals at 16 KHz to produce down-sampled signals and then applying a Hidden Markov Model based detector to said down-sampled signals,
separating, at said nodes, said digital signals into segments including at least one of a main shock wave segment, a main muzzle blast segment and other segments, said step of separating including the substeps of applying a moving average filter to a gradient of a cumulative likelihood ratio of samples of said digital signal, selecting segments from said digital signal with a moving average greater than a selected threshold, sorting said selected segments in descending order, and choosing a first selected segment as said main shock wave segment and a second selected segment as said main muzzle blast segment,
calculating, at said nodes, a time of arrival of each said segment,
extracting, at said nodes, features from each said segment, said step of extracting features including the substep of constructing a feature vector from a Hidden Markov Model state propagation sequence for said segment,
identifying, at said base station, each said time of arrival as one of a main shock wave and a main muzzle blast time of arrival from said features, and
computing, at said base station, said trajectory from said main shock wave times of arrival, said trajectory including velocity and acceleration, said step of computing said trajectory including the substeps of selecting a reference node and calculating said trajectory from an observed time difference of arrival for said main shock wave segment for each node relative to said reference node, wherein said substep of calculating said trajectory includes minimizing a cost function based on errors between said observed time differences of arrival for said nodes and theoretical time differences of arrival for said nodes generated from a model, and wherein said model provides that a theoretical main shock wave time of arrival is the sum of a time of said gunshot, a time for a projectile to travel from an origin of said projectile to a shock wave source point and a time for a shock wave to travel from said shock wave source point to said node, and said theoretical main shock wave time of arrival is a function of said origin of said projectile, the position of said node, a trajectory angle for said projectile, an initial velocity of said projectile and an acceleration of said projectile, and
computing, at said base station, an origin for said projectile from said main muzzle blast times of arrivals.

14. A system for finding the trajectory of a gunshot projectile from acoustic signals, comprising:
a plurality of spaced, distributed sensor nodes, each said sensor node including:
an acoustic sensor for sensing said acoustic signals,
means for separating said acoustic signals into segments including at least one of a main shock wave segment, a main muzzle blast segment and other segments,
means for calculating a time of arrival of each said segment, and
means for extracting features from each said segment, and
a base station in communication with said nodes, including:
means for identifying each said time of arrival as one of a main shock wave and a main muzzle blast time of arrival from said features,
a processor, and
means for computing said trajectory from said main shock wave times of arrival, said trajectory including velocity and acceleration, including instructions in said processor for selecting a reference node and calculating said trajectory from an observed time difference of arrival for said main shock wave segment for each node relative to said reference node, wherein said instructions for calculating said trajectory include instructions for minimizing a cost function based on errors between said observed time differences of arrival for said nodes and theoretical time differences of arrival for said nodes generated from a model.

15. The system as set forth in claim 14 wherein said base station includes means for computing said origin from said times of arrival for said main muzzle blast segments.

16. The system as set forth in claim 14 wherein:
said means for identifying includes said processor and instructions in said processor for identifying each said time of arrival as one of a main shock wave and a main muzzle blast time of arrival from said features, and
said means for computing includes said processor and instructions in said processor for computing said trajectory from said main shock wave times of arrival.

17. The system as set forth in claim 14 wherein said model provides that a theoretical main shock wave time of arrival is the sum of a time of said gunshot, a time for a projectile to travel from said origin of said gunshot to a shock wave source point and a time for a shock wave to travel from said shock wave source point to said node, and said theoretical main shock wave time of arrival is a function of said origin of said gunshot, the position of said node, a trajectory angle for said projectile, an initial velocity of said projectile and an acceleration of said projectile.

18. The system as set forth in claim 17 wherein said time for said projectile to travel from said origin of said gunshot to said shock wave source point equals:

$$\frac{-2v_0 + \sqrt{4v_0^2 + 8\alpha x_d}}{2\alpha}$$

where v0 is said initial velocity of said projectile, xd is the distance from said origin of said gunshot to said shock wave source point, and $\alpha$ is said acceleration of said projectile.

19. The system as set forth in claim 16 wherein each said node includes means for detecting a gunshot in said acoustic signals.

20. The system as set forth in claim 14 wherein:
each said node includes a processor,
said means for separating includes said processor and instructions in said processor for separating said acoustic signals into segments, said means for calculating includes said processor and instructions in said processor for calculating said time of arrival of each said segment, and said means for extracting features includes said processor and instructions in said processor for extracting features from each said segment.

\* \* \* \* \*